Figure 1:
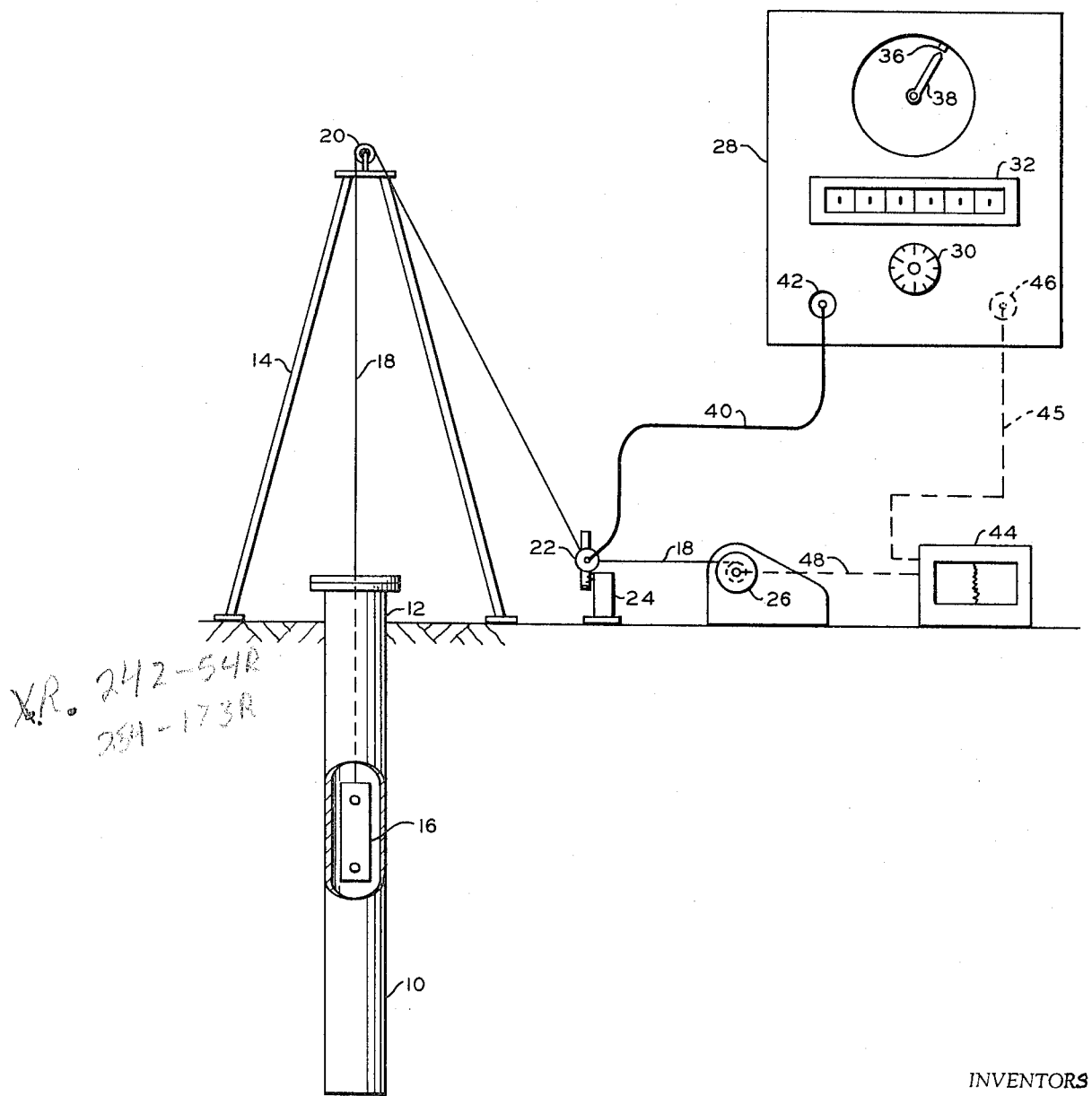

INVENTORS
C.W. TRUBENBACK
B.F. WILEY
ATTORNEYS

United States Patent Office 3,292,904
Patented Dec. 20, 1966

3,292,904
WIRE LINE LOGGING TIME-DEPTH
CORRELATOR
Charles Willis Trubenback and Bruce F. Wiley, Bartlesville, Okla., assignors to Phillips Petroleum Company, a corporation of Delaware
Filed Oct. 5, 1964, Ser. No. 401,389
8 Claims. (Cl. 254—145)

This invention relates to a method and apparatus for controlling the vertical movement of a logging tool or similar device so as to move same in a well bore hole at a constant rate.

Downhole logging devices are in conventional use in the petroleum industry. Recently, self-contained downhole logging devices have come into use. Such a logging device includes all of the equipment required for putting out, receiving, and recording signals including a tape recorder. Self-contained nuclear well logging devices of this type are available commercially. Some downhole logging devices utilize a recorder above ground which picks up electrical signals from the cable suspending the device and the magnetic tape is included in the recorder.

Because of practical limitations of self-contained or downhole logging devices, the measurement of depth varying borehole parameters is made initially against a time base and later transformed to a depth base. In order to minimize error in the time to depth transformation, a close correlation must be maintained between time and depth while the downhole recording is being made. This device is used in particular with nuclear well logging devices because the nuclear counts are measured and integrated over a period of time, and, therefore, it is necessary that the nuclear well logging device move uphole at a uniform time rate. In order that a fixed relation between time and depth can be easily held by the operator of a logging line reel, this invention provides a mechanical aid called a time-depth correlator. This device has been produced for use with downhole magnetic tape recorder systems. In addition it should be of value wherever a logging or borehole operation requires carefully controlled probe speed.

Accordingly, it is an object of the invention to provide a method and apparatus for operation of a downhole probe, logging instrument, or similar device at a controlled uniform speed or rate of vertical movement. Other objects of the invention will become apparent to one skilled in the art upon consideration of the accompanying disclosure.

A broad aspect of the invention comprises translating the rotational movement of a pulley or wheel, over which the well cable or wire is run from the downhole device to the cable reel, to rotational movement of a drive wheel or gear at a substantially reduced speed at fixed reduced ratio, translating the rotational movement of the drive wheel to rotational movement of a pointer, and rotating an index dial in a plane parallel to and adjacent the plane of rotation of the pointer at a uniform rate by means of a device such as a clock motor, so that operation of the cable reel to synchronize the movement of the pointer and the index on the dial effects movement of the downhole device at a uniform rate of speed.

A conventional device for feeding the wire or cable into the well and retrieving same comprises a reel or windlass on which the cable winds and unwinds and a non-slip pulley on the wheel positioned above ground usually between a derrick provided with a fixed pulley over the well bore and the cable reel. The Halliburton measuring device provides an excellent non-slip wheel or pulley in this application even though the counter thereon is of no particular use because a counter is utilized with the ratio translator or gear box. This gear box is connected by means of a flexible shaft with the non-slip pulley and is set for any desired ratio between the rotational movement of the pulley and the rotational movement of the drive wheel of the gear box. The drive wheel is connected by a belt or chain to a driven wheel on a shaft which includes a pointer operating on an index dial which, in turn, is rotated by means of a clock motor or similar device at a uniform rotational speed.

Figure 2:
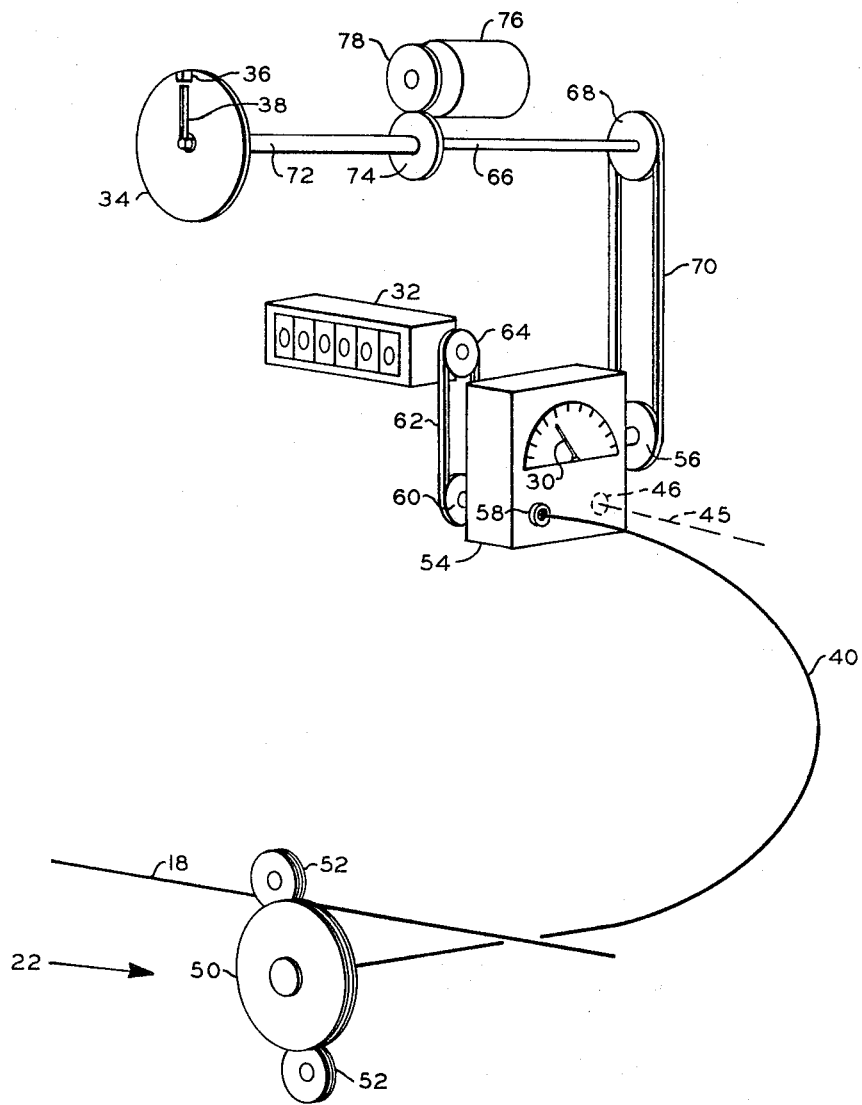

A more complete understanding of the invention may be had by reference to the accompanying schematic drawing of which FIGURE 1 shows an arrangement of apparatus in relation to a well in accordance with the invention and FIGURE 2 is a pictorial view of the arrangement of the above-ground apparatus of FIGURE 1.

Referring to FIGURE 1 a well bore 10 is provided with a casing 12 and derrick means 14. A self-contained well logging device 16 is suspended in the well bore by means of a cable or wire line 18 which runs over a fixed pulley 20 on derrick 14 and thru a Halliburton measuring device 22 fixed to a support 24 intermediate pulley 20 and windlass or reel 26.

An instrument box 28 contains a gear box or ratio controller having a dial 30, an odometer 32, a rotatable dial 34 having an index 36, and a rotatable pointer 38. A mechanical linkage, preferably in the form of a flexible shaft 40 connects with the rotating pintle or axle of pulley 22 and with the driven gear (input gear 42) of the gear box.

In the event logging device 16 is not self-contained and utilizes a recorder above ground, this recorder is designated 44 and is connected with a driving gear 46 of the gear box by means of linkage 45 for operating the magnetic tape and the signal receiving contacts of recorder 44 are connected by electrical conduit means 48 with a commutator on the shaft of reel 26 which connects with an electrical conduit means in cable 18.

Referring to FIGURE 2, Halliburton measuring device 22 comprises a non-slip pulley 50 thru which the cable or wire line 18 travels from reel 26 to the well device 16. In order to prevent slippage, a pair of pressure wheels 52 on opposite sides of the pulley are provided.

Gear box 54 is provided with a dial 30 including an indicator for setting the desired ratio between the output wheel 56 and the input wheel 58. Wheel or gear 58 is connected thru flexible coupling 40 with a gear (not shown) on pulley 50. A second output wheel 60 on gear box 54 is connected by linkage 62 with the driven wheel 64 of odometer 32 which is calibrated to indicate the feet of movement of instrument 16 within the well during operation of windlass 26.

A shaft 66 is provided with a driven wheel or pulley 68 on one end and pointer 38 on the opposite end. A belt or other linkage 70 connects driving pulley 56 with driven pulley 68 for operation of pointer 38. A second shaft 72 (tubular) is coaxial with shaft 66 and rotatable independently thereof. Shaft 72 is provided with disk 34 fixed on one end and pulley 74 fixed on the other end, both being rotatable with shaft 72. A clock motor 76 is positioned so that its driving gear or wheel 78 is operatively connected with pulley or gear 74 on shaft 72.

In operation of the apparatus shown in the drawing, dial 34 is driven at constant speed by clock 76 which may be an electric clock or a spring wound clock. In the device built and operated in the field, this clock was a Haydon electric clock which operated dial 34 at one r.p.m. As the wire line or cable 18 runs thru pulley 50, pointer 38 is rotated at some constant ratio relative to the logging probe travel rate (device 16). This ratio is determined by the gear train in gear box 54 and may be varied by changing gear ratios therein. This ratio is varied from one turn of the pointer 38 for 5 feet of travel of the cable to one turn per 80 feet of travel to suit the specific conditions desired in the logging situation. This ratio change is made in several steps within gear box 54.

It should now be apparent that if the operator controls the power drive on windlass or reel 26 in such a way as to keep the pointer 38 tracking or synchronized with the index 36 on dial 34, the probe or device in the bore hole will move at a constant linear rate. Moreover, this rate will correspond in feet per minute to the ratio of the drive between the measuring device and the pointer shaft 66. To illustrate, if this ratio is 30:1, the rate of travel of the probe is 30 feet per minute.

The device constructed substantially in accordance with the invention and illustrated in the drawing was operated successfully and efficiently in well logging. The apparatus included a Haydon clock as element 26, an odometer from Veeder Root, Inc., Hartford, Conn., a gear box from Insco Co., Groton, Mass., and a Halliburton measuring device as element 22. These elements of the apparatus in combination are simply illustrative of commercially available equipment which are operable in the combination.

Certain modifications of the invention will become apparent to those skilled in the art and the illustrative details disclosed are not to be construed as imposing unnecessary limitations on the invention.

We claim:

1. A method of moving a downhole well logging device on a line connecting same with a reel above ground, at a constant rate of speed which comprises the steps of:
   (a) mechanically sensing the rate of linear movement of said line;
   (b) translating the rate of movement in step (a) to rotation of a pointer at a substantial reduction of rate and in a fixed ratio to said linear movement;
   (c) rotating a dial at a constant rate in a plane adjacent and parallel with the rotating plane of the pointer of step (b); and
   (d) regulating the linear movement of the line in step (a) so as to cause the pointer of step (b) to maintain a fixed position with respect to an index on the rotating dial of step (c).

2. The method of claim 1 wherein the linear movement of said line is translated into a revolution of said pointer for a selected number of feet of linear travel and said dial is revolved at a rate of a revolution per selected time interval.

3. The method of claim 2 wherein said dial is rotated one revolution for a selected distance of travel of said line in the range of 5 to 80 feet.

4. Apparatus for moving a downhole well logging device thru a well at a constant vertical linear velocity which comprises in combination:
   (1) a downhole logging device suspended on a cable passing thru the well head;
   (2) a reel above ground, a substantial length of said cable being wound thereon;
   (3) a fixed non-slip pulley above said well head, said cable being threaded thru said pulley;
   (4) a gear box for reducing speed;
   (5) a flexible shaft connecting the axle of said pulley with a driving gear in said gear box;
   (6) a first rotatable shaft having a pointer fixed rotatable therewith and a drive pulley thereon;
   (7) driving means connecting an output gear of said gear box with the drive pulley of (6);
   (8) a second tubular rotatable shaft having driving means and an indexed dial thereon rotatable with said second shaft, said first and second shafts being coaxially disposed so as to rotate said pointer immediately in front of said dial; and
   (9) a clock motor operatively connected with the driving means on said second shaft.

5. The apparatus of claim 4 including:
   (10) an odometer operatively connected with a driving gear in said gear box to indicate the linear movement of the device of (1).

6. The apparatus of claim 4 wherein the ratio of rotation of said dial to the linear travel of said cable is 1 rotation to a travel distance in the range of 5 to 80 feet.

7. Apparatus comprising in combination:
   (1) a fixed non-slip pulley;
   (2) a reel carrying a supply of cable, the free end of which is threaded thru said pulley;
   (3) a reducing gear box operatively connected with said pulley;
   (4) a first shaft having a pointer thereon rotatable therewith and a driving means operatively connected with said gear box;
   (5) a second tubular shaft concentric with said first shaft and having an indexed dial thereon rotatable therewith in a plane parallel and adjacent the plane of rotation of said pointer; and
   (6) a clock motor operatively connected to rotate said second shaft.

8. Apparatus comprising in combination:
   (1) a non-slip pulley;
   (2) a cable threaded on said pulley having a suspended weight on one end;
   (3) means on the other end of said cable for releasing and taking up cable;
   (4) means operatively connected with said pulley for translating revolutions of said pulley to revolutions of a driving element at a reduced ratio;
   (5) means including a rotatable pointer for translating the revolutions of said pointer; and
   (6) means including an indexed dial for rotating said dial in a plane parallel and adjacent the plane of rotation of said pointer at a uniform rate, whereby operation of the means of (3) so as to synchronize the movement of said pointer and said dial effects linear movement of the weight of (2) at a uniform rate.

References Cited by the Examiner

UNITED STATES PATENTS

| | | | |
|---|---|---|---|
| 2,544,155 | 3/1951 | Harkenrider | 222—76 |
| 2,656,027 | 8/1953 | Crookston | 254—173 |
| 2,876,963 | 3/1959 | Selegue | 254—173 |
| 2,969,893 | 1/1961 | Peeters | 222—70 |
| 2,985,431 | 5/1961 | Sutherland | 254—168 |

SAMUEL F. COLEMAN, *Primary Examiner.*